2,846,475

PROCESSES AND INTERMEDIATES FOR THE PREPARATION OF CAROTENOIDS

Otto Isler, Marc Montavon, and Rudolf Rüegg, Basel, and Paul Zeller, Neuallschwil, near Basel, Switzerland, assignors to Hoffmann-La Roche Inc., Nutley, N. J., a corporation of New Jersey No Drawing. Application July 13, 1956
Serial No. 597,585

Claims priority, application Switzerland July 20, 1955

5 Claims. (Cl. 260—617)

The present invention relates to a process for the manufacture of carotenoids.

All known syntheses of β-carotene start from vitamin A intermediates obtained from β-ionone. In a first synthesis according to Inhoffen this starting compound was used for synthesising first a $C_{19}$-aldehyde which was added to acetylene di-magnesium bromide at both ends thereof ($C_{19}+C_2+C_{19}=C_{40}$). A further synthesis according to Inhoffen is based on the building scheme $$C_{18}+C_4+C_{18}=C_{40}$$

in which two molecules of β-$C_{18}$-ketone are linked together by di-acetylene. The other syntheses start from $C_{16}$-acetylene compounds and octen-(4)-dione-(2,7) according to the scheme $C_{16}+C_8+C_{16}=C_{40}$. In all these syntheses $C_{40}$-acetylene diols or tetrols are formed as intermediates which must be converted into β-carotene by tedious methods. The synthesis of β-carotene from vitamin-A- and vitamin-$A_2$-aldehyde, respectively, had not been accomplished as yet.

We have now found that carotenoids can be obtained in a simple manner from vitamin-A- or vitamin-$A_2$-aldehyde by synthesising the carbon skeleton of the carotenoids comprising 40 carbon atoms according to the new building scheme $C_{20}+C_2+C_{18}=C_{40}$. The process according to the present invention comprises condensing acetylene by a metal-organic condensation, on the one hand, with 9 - [2',6',6' - trimethyl-cyclohexen - (1')-yl]-3,7-dimethyl - nonatetraen - (2,4,6,8) - al-(1) (vitamin-A-aldehyde) in which the trimethyl-cyclohexenyl nucleus may have an additional double bond in the 3',4'-position (vitamin-$A_2$-aldehyde) and, on the other hand, with 8-[2',6',6'-trimethyl-cyclohexen-(1')-yl]-6-methyl-octatrien-(3,5,7)-one-(2) (β-$C_{18}$-ketone) in which the trimethyl-cyclohexenyl nucleus may have an additional double bond in the 3',4'-position (dehydro-β-$C_{18}$-ketone), hydrolysing the resulting metal-organic condensation product, and treating the resulting 1,18-di-[2',6',6'-trimethyl-cyclohexen-(1') - yl] - 3,7,12,16-tetramethyl-octadecaheptaen-(1,3,5,-11,13,15,17) - yne - (8) - diol-(7,10) (as-β-$C_{40}$-acetylene-diol) in which one or both nuclei may have an additional double bond in the 3',4'-position with excess lithium-aluminum-hydride.

In the first step of the process according to the present invention β- or dehydro-β-$C_{18}$-ketone or vitamin-A- or vitamin-$A_2$-aldehyde are reacted in liquid ammonia with an alkali or alkaline earth metal acetylide and the resulting condensation product, preferably after having been hydrolysed to 9-[2',6',6'-trimethyl-cyclohexen(1')-yl]- or 9-[2',6',6' - trimethyl-cyclohexadien-(1'.3')yl]-3,7-dimethyl-nonatrien-(4,6,8)-yne-(1)-ol-(3) (β- or dehydro-β-$C_{20}$-acetylene carbinol) or 11-[2',6',6'-trimethyl-cyclohexen-(1')-yl]- or 11-[2',6',6'-trimethyl-cyclohexadien-(1',3')-yl]-5,9 - dimethyl - undecatetraen-(4,6,8,10)-yne-(1) - ol - (3) (β- or dehydro - β - $C_{22}$ - acetylene carbinol), is condensed with vitamin-A- or vitamin-$A_2$-aldehyde or with β- or dehydro-β-$C_{18}$-ketone by means of a metal-organic reaction. The condensation of the starting ketone or aldehyde with the methyl acetylide in liquid ammonia can be carried out under elevated pressure at room temperature or at normal pressure at the boiling temperature of ammonia. The condensation is carried out by means of an alkali metal acetylide, such as sodium or lithium acetylide, or by means of an alkaline earth metal acetylide, such as calcium acetylide, which is conveniently prepared from alkali or alkaline earth metal and acetylene prior to the condensation reaction in the same vessel and the same ammonia which are used for the condensation. Lithium acetylide is preferably used for the condensation. The β- or dehydro-β-$C_{18}$-ketone or the vitamin-A- or vitamin-$A_2$-aldehyde, respectively, can be added in an inert solvent, such as diethyl ether. The condensation product may be hydrolysed in liquid ammonia by adding an ammonium salt thereto or after removal of the ammonia by treatment with acid. The β-$C_{20}$-, dehydro-β-$C_{20}$-, β-$C_{22}$- and dehydro-β-$C_{22}$-acetylene carbinols are all viscous oils. In the active hydrogen test according to Zerewitinoff they show 1 mole of active hydrogen atoms in the cold and 2 moles of active hydrogen atoms at elevated temperature. They have characteristic absorption maxima in the ultra-violet spectrum. The condensation of β- or dehydro-β-$C_{20}$-acetylene carbinol with vitamin-A- or vitamin-$A_2$-aldehyde, or the condensation of β- or dehydro-β-$C_{22}$-acetylene carbinol with β- or dehydro-β-$C_{18}$-ketone is carried out by a metal-organic reaction, e. g. by subjecting the acetylene carbinol to the action of two moles of alkyl-magnesium halide or two moles of phenyl-lithium in an inert solvent. The first mole of organo-metallic compound is attached to the hydroxyl group whereas the second mole reacts with the acetylene bond, the terminal carbon atom being thus adapted for condensation. The formed di-magnesium halide compound or di-lithium compound is then reacted with the aldehyde or ketone, conveniently in the same solvent. The β-$C_{20}$- or dehydro-β-$C_{20}$- or β-$C_{22}$- or dehydro-β-$C_{22}$- acetylene carbinol is conveniently treated in a solvent, such as diethyl ether, with two moles of alkyl-magnesium halide, and the formed di-magnesium halide compound is condensed, without isolation and purification, with 1 mole of vitamin-A- or vitamin-$A_2$-aldehyde, or with β- or dehydro-β-$C_{18}$-ketone. The condensation product, suitably without purification is hydrolysed in the usual manner, e. g. by pouring it into a mixture of ice and dilute sulphuric acid to obtain the asymmetric $C_{40}$-acetylene-diol corresponding to the acetylene carbinol and aldehyde or ketone used. There is obtained 1,18-di-[2',6',6'-trimethyl - cyclohexen - (1')-yl]3,7,12,16-tetramethyl-octadecaheptaen - (1,3,5,11,13,15,17)-yne-(8)-diol-(7,10) (as-β-$C_{40}$-acetylene-diol) from β-$C_{20}$-acetylene carbinol and vitamin-A-aldehyde, or from β-$C_{22}$-acetylene carbinol and β-$C_{18}$-ketone; 1,18-di-[2',6',6'-trimethyl-cyclohexadien - (1',3') - yl] - 3,7,12,16-tetramethyl-octadecaheptaen-(1,3,5,11,13,15,17)-yne-(8)-diol-(7,10) (as-bis-dehydro-β-$C_{40}$-acetylene diol) from dehydro-β-$C_{20}$-acetylene carbinol and vitamin-$A_2$-aldehyde, or from dehydro-β-$C_{22}$-acetylene carbinol and dehydro-β-$C_{18}$-ketone; 1-[2',6',6'-trimethyl - cyclohexadien-(1',3')-yl]-18-[2',6', 6'-trimethyl-cyclohexen - (1')-yl]-3,7,12,16-tetramethyl-octadecaheptaen - (1,3,5,11,13,15,17)-yne-(8)-diol-(7,10) (as-dehydro-β-$C_{40}$-acetylene-diol A) from dehydro-β-$C_{20}$-acetylene carbinol and vitamin-A-aldehyde, or from β-$C_{22}$-acetylene carbinol and dehydro-β-$C_{18}$-ketone; and 1-[2', 6',6'-trimethyl - cyclohexen-(1')-yl]-18-[2',6',6'-trimethyl-cyclohexadien - (1',3') - yl] - 3,7,12,16-tetramethyl-octadecaheptaen-(1,3,5,11,13,15,17)-yne-(8)-diol-(7,10) (as-dehydro-β-$C_{40}$-acetylene-diol B) from β-$C_{20}$-acetylene carbinol and vitamin-$A_2$-aldehyde, or from dehydro-β-$C_{22}$-acetylene carbinol and β-$C_{18}$-ketone. The obtained diols are very viscous oils which show characteristic absorption maxima in the ultra-violet spectrum. In the active hydrogen test according to Zerewitinoff they show two moles of active hydrogen atoms.

In the final step of the process according to the present invention the asymmetric $C_{40}$-acetylene-diol is treated with excess lithium-aluminum-hydride. In this reaction the triple bond is partially hydrogenated, and—surprisingly—the hydroxyl groups are simultaneously eliminated with formation of an additional double bond, so that all double bonds are conjugated. In the present process the partial hydrogenation and the elimination of the hydroxyl groups occur simultaneously when treating the as-$C_{40}$-acetylene diol in an inert solvent with excess lithium-aluminum-hydride at a temperature comprised between 20 and 100° C. Suitable solvents for this purpose include aliphatic or cyclic ethers, such as diethyl ether, ethylene glycol dimethyl ether or dioxane; and organic tertiary amines, such as diethyl aniline. In order to avoid losses of substance owing to oxidation, it is advisable to operate in an inert atmosphere. In the preferred mode of execution the as-$C_{40}$-acetylene-diol is stirred in diethyl ether or diethyl aniline with 2-4 moles of lithium-aluminum-hydride at 30-60° C. in a nitrogen atmosphere. There is thus obtained β-carotene from as-β-$C_{40}$-acetylene-diol; 3,4,3',4'-bisdehydro-β-carotene from as-bisdehydro-β-$C_{40}$-acetylene-diol; and 3,4-dehydro-β-carotene from as-dehydro-β-$C_{40}$-acetylene-diols A and B. The three products of the process can be purified by crystallisation, distribution between solvents or chromatography. They form dark-violet crystals which show characteristic absorption maxima in the ultra-violet spectrum:

|  | Melting point, °C. | U. V.-absorption maxima in petroleum ether, m$\mu$ |
| --- | --- | --- |
| β-carotene | 180 | 452-453; 480-481 |
| 3,4-dehydro-β-carotene | 186 | 461 |
| 3,4,3',4'-bisdehydro-β-carotene | 190-191 | 471 |

The obtained carotenoids can be stabilised by the addition of antioxidants which may be present also during the synthesis. They are valuable dyestuffs which possess a vitamin-A-like activity and may be used for dyeing foodstuffs.

EXAMPLE 1

β-Carotene (a) β-$C_{20}$-ACETYLENE CARBINOL

Into a solution of 0.7 part by weight of lithium in 400 parts by volume of liquid ammonia there was introduced dry, acetone-free acetylene until the lithium was completely reacted with acetylene. To the obtained solution there was then added within 10 minutes, with vigorous stirring, a solution of 22 parts by weight of 8-[2',6',6'-trimethyl-cyclohexen-(1')-yl]-6-methyl-octatrien-(3,5,7)-one-(2) (U. V.-absorption maximum at 332 m$\mu$ in petroleum ether in 100 parts by volume of absolute ether, and the reaction mixture was strongly stirred for 20 hours with exclusion of humidity. Then 12 parts by weight of ammonium chloride were added in small portions, and the ammonia was allowed to evaporate. After addition of 100 parts by volume of water the ether layer was separated, washed with water, dried over sodium sulphate and concentrated. The residual reddish oil was sharply dried in vacuo. There were thus obtained 22.8 parts by weight of crude 9-[2',6',6'-trimethyl-cyclohexen-(1')-yl]-3,7-dimethyl-nonatrien-(4,6,8)-yne-(1)-ol-(3). This product can be purified by distribution between petroleum ether and 90% methanol or by chromatography on alumina. The active hydrogen determination according to Zerewitinoff shows 1 mole of active hydrogen atoms in the cold and 2 moles of active hydrogen atoms at elevated temperature. Ultra-violet absorption maximum at 292 m$\mu$ (in petroleum ether).

(b) AS-β-$C_{40}$-ACETYLENE-DIOL 2.8 parts by weight of 9-[2',6',6'-trimethyl-cyclohexen-(1')-yl]-3,7-dimethyl-nonatrien-(4,6,8)-yne-(1)-ol-(3) were dissolved in 30 parts by volume of absolute ether, and the solution was gradually added at 10-20° C., while stirring, to a Grignard solution prepared from 0.52 part by weight of magnesium, 2.5 parts by weight of ethyl bromide and 20 parts by volume of absolute ether. The mixture was then refluxed for 1 hour in a nitrogen atmosphere and then cooled with ice water. A solution of 2.8 parts by weight of 9-[2',6',6'-trimethyl-cyclohexen-(1')-yl]-3,7-dimethyl-nonatetraen-(2,4,6,8)-al-(1) in 30 parts by volume of absolute ether was added to the reaction mixture at about 20° C., and the mixture was refluxed for 3-4 hours in a nitrogen atmosphere. The resulting reaction solution was poured onto a mixture of 40 parts by volume of 3 N sulphuric acid and 60 parts by weight of ice, the ether layer was separated, washed with 5% sodium bicarbonate solution, dried over sodium sulphate and evaporated in vacuo. There were thus obtained 5.8 parts by weight of 1,18-di-[2',6',6'-trimethyl-cyclohexen-(1')-yl]-3,7,12,16-tetramethyl-octadecaheptaen-(1,3,5,11,13,15,17)-yne-(8)-diol-(7,10) which was further reacted without any preliminary purification. Ultra-violet absorption maxima at 294 and 330 m$\mu$ (in petroleum ether).

(c) β-CAROTENE 5.6 parts by weight of 1,18-di-[2',6',6'-trimethyl-cyclohexen-(1')-yl]-3,7,12,16-tetramethyl-octadecaheptaen-(1,3,5,11,13,15,17)-yne-(8)-diol-(7,10) were dissolved in 100 parts by volume of absolute ether, and to the resulting solution there was gradually added at 10-20° C., while stirring, a solution of 1.14 parts by weight of lithium-aluminum-hydride in 40 parts by volume of absolute ether. The mixture was refluxed for 24 hours in a nitrogen atmosphere. The reaction mixture was then poured onto a mixture of 100 parts by volume of saturated aqueous ammonium chloride solution and 100 parts by volume of ice, whereupon the ether layer was separated, dried over sodium sulphate and concentrated. The thus obtained crude β-carotene can be purified by distribution between solvents or by chromatography. Violet crystals from methylene chloride-methanol; M. P. 180° C.; U. V. absorption maxima at 452-453 and 480-481 m$\mu$ (in petroleum ether).

EXAMPLE 2

β-Carotene (a) β-$C_{22}$-ACETYLENE CARBINOL

By reacting 5 parts by weight of 9-[2',6',6'-trimethyl-cyclohexen-(1')-yl]-3,7-dimethyl-nonatetraen-(2,4,6,8,)-al-(1) with a lithium acetylide solution (prepared from 0.2 part by weight of lithium and acetylene in 100 parts by volume of liquid ammonia) and working up the reaction product in the manner described in Example 1(a) there were obtained 5.2 parts by weight of 11-[2',6',6'-trimethyl-cyclohexen-(1')-yl]-5,9-dimethyl-undecatetraen-(4,6,8,10)-yne-(1)-ol-(3) which showed an absorption maximum in the ultra-violet spectrum at 332 m$\mu$ in petroleum ether. The active hydrogen determination according to Zerewitinoff showed 1 mole of active hydrogen atoms in the cold and two moles of active hydrogen atoms at elevated temperature.

(b) AS-β-$C_{40}$-ACETYLENE-DIOL

In the manner described in Example 1(b), 5.2 parts by weight of 11-[2',6',6'-trimethyl-cyclohexen-(1')-yl]-5,9-dimethyl-undecatetraen-(4,6,8,10)-yne-(1)-ol-(3) were reacted with an ethyl-magnesium bromide solution prepared from 0.9 part by weight of magnesium and 4.5 parts by weight of ethyl bromide in 50 parts by volume of absolute ether, and the reaction product was then condensed with 4.3 parts by weight of 8-[2',6',6'-trimethyl - cyclohexen - (1') - yl] - 6 - methyl - octatrien-(3,5,7)-one-(2). After working up the condensation product there were obtained 9.3 parts by weight of crude 1,18 - di - [2',6',6' - trimethyl - cyclohexen - (1') - yl] - 3,7,12,16 - tetramethyl - octadecaheptaen - (1,3,5,11,13,-15,17)-yne-(8)-diol-(7,10). This product can be further reacted without any preliminary purification.

(c) β-CAROTENE 8 parts by weight of 1-18-di-[2',6',6'-trimethyl-cyclohexen - (1') - yl] - 3,7,12,16 - tetramethyl - octadecaheptaen-(1,3,5,11,13,15,17)-yne-(8)-diol-(7,10) were suspended in 150 parts by volume of diethyl aniline, and to the suspension there were gradually added at 10–20° C., while stirring, a solution of 1.6 parts by weight of lithium-aluminum-hydride in 40 parts by volume of absolute ether. The reaction mixture was stirred for 20 hours in a nitrogen atmosphere at 50–60° C. and then poured into a mixture of 500 parts by volume of 3 N sulphuric acid and 300 parts by weight of ice. The reaction product was extracted with ether, and the ether solution was washed successively with ice-cold 3 N sulphuric acid, water and sodium bicarbonate solution, dried over sodium sulphate and concentrated. There were thus obtained 7.3 parts by weight of crude β-carotene. This product can be purified by distribution between solvents or by chromatography.

EXAMPLE 3

3,4-dehydro-β-carotene (a) DEHYDRO-β-$C_{20}$-ACETYLENE CARBINOL

By reacting 55 parts by weight of 8-[2',6',6'-trimethyl-cyclohexadien-(1',3')-yl]-6-methyloctatrien-(3,5,7) - one-(2) with a lithium acetylide solution (prepared from 1.7 parts by weight of lithium and acetylene in 700 parts by volume of liquid ammonia) and working up the reaction product in the manner described in Example 1(a) there were obtained 57 parts by weight of crude 9-[2',6',6' - trimethyl - cyclohexadien-(1',3')-yl] - 3,7 - dimethyl-nonatrien-(4,6,8)-yne-(1)-ol-(3). This product can be purified by distribution between solvents or by chromatography. The active hydrogen determination according to Zerewitinoff showed 1 mole of active hydrogen atoms in the cold and 2 moles of active hydrogen atoms at elevated temperature. Ultra-violet absorption maximum at 326 mμ in petroleum ether.

(b) AS-DEHYDRO-β-$C_{40}$-ACETYLENE-DIOL A

In the manner described in Example 1(b), 4.2 parts by weight of 9-[2',6',6'-trimethyl-cyclohexadien-(1',3')-yl]-3,7 - dimethyl-nonatrien-(4,6,8)-yne-(1)-ol-(3) were reacted with a Grignard solution prepared from 0.8 part by weight of magnesium, 3.8 parts by weight of ethyl bromide and 50 parts by volume of absolute ether, and the reaction product was condensed with 4.2 parts by weight of 9-[2',6',6'-trimethyl-cyclohexen-(1')-yl]-3,7,-dimethyl-nonatraen-(2,4,6,8)-al-(1). After working up the condensation product there were obtained 8.2 parts by weight of crude 1-[2',6',6'-trimethyl-cyclohexadien-(1',3')-yl]-18-[2',6',6'-trimethyl-cyclohexen - (1') - yl]-3,7,12,16 - tetramethyl - octadecaheptaen-(1,3,5,11,13,15,17)-yne-(8)-diol-(7,10). This product can be further reacted without any preliminary purification. Ultraviolet absorption maximum at 330 mμ in petroleum ether.

(c) 3,4-DEHYDRO-β-CAROTENE

By treating 7 parts by weight of 1-[2',6',6'-trimethyl-cyclohexadien-(1',3')-yl]-18-[2',6',6' - trimethyl - cyclohexen-(1') - yl]-3,7,12,16 - tetramethyl - octadecaheptaen-(1,3,5,11,13,15,17) - yne - (8) - diol-(7,10) with lithium-aluminum-hydride and working up the reaction product in the manner described in Example 1(c) there was obtained 3,4-dehydro-β-carotene which was purified by chromatography and crystallisation. Violet crystals from methylene chloride-methanol; M. P. 186° C.; U. V. absorption maximum at 461 mμ in petroleum ether.

What we claim is:

1. 1,18 - di - [2',6',6' - trimethyl-cyclohexen-(1')-yl]-3,7,12,16 - tetramethyl - octadecaheptaen - (1,3,5,11,13,15,17)-yne-(8)-diol-(7,10).

2. 1 - [2',6',6' - trimethyl - cyclohexadien-(1',3')-yl]-18 - [2',6',6'-trimethyl - cyclohexen - (1')-yl]-3,7,12,16-tetramethyl-octadecaheptaen - (1,3,5,11,13,15,17) - yne-(8)-diol-(7,10).

3. A process which comprises condensing acetylene by metal-organic condensations through one of its reactive hydrogen atoms with an aldehyde selected from the group consisting of 9 - [2',6',6' - trimethyl-cyclohexen-(1')-yl]-3,7-dimethyl-nonatetraen-(2,4,6,8)-al-(1) and 9-[2',6',6'-trimethyl-cyclohexadien-(1',3')-yl] - 3,7-dimethyl - nonatetraen-(2,4,6,8)-al-(1) and through the other of its reactive hydrogen atoms with a ketone selected from the group consisting of 8-[2',6',6'-trimethyl-cyclohexen-(1')-yl] - 6 - methyloctatrien - (3,5,7)-one-(2) and 8-[2',6',6'-trimethyl-cyclohexadien-(1',3')-yl] - 6 - methyloctatrien-(3,5,7)-one-(2), thereby forming a $C_{40}$ acetylenic diol selected from the group consisting of 1,18-di-[2',6',6'-trimethyl-cyclohexen-(1')-yl] - 3,7,12,16 - tetramethyl-octadecaheptaen - (1,3,5,11,13,15,17) - yne - (8)-diol-(7,10), 1-[2',6',6'-trimethyl - cyclohexadien-(1',3')-yl]-18-[2',6',6'-trimethyl-cyclohexen - (1')-yl]-3,7,12,16-tetramethyl - octadecaheptaen - (1,3,5,11,13,15,17) - yne-(8)-diol-(7,10), 1-[2',6',6'-trimethyl-cyclohexen-(1')-yl]-18-[2',6',6' - trimethyl - cyclohexadien - (1',3') - yl]-3,7,12,16 - tetramethyl-octadecaheptaen - (1,3,5,11,13,15,17)-yne-(8)-diol-(7,10), and 1,18-di-[2',6',6'-trimethyl-cyclohexadien - (1',3') - yl] - 3,7,12,16 - tetramethyl-octadecaheptaen - (1,3,5,11,13,15,17)-yne - (8) - diol-(7,10); and treating said $C_{40}$ acetylenic diol with excess lithium aluminum hydride, thereby forming a $C_{40}$ carotenoid.

4. A process which comprises condensing acetylene by means of metal-organic reactions through one of its reactive hydrogen atoms with 9-[2',6',6'-trimethyl-cyclohexen-(1') - yl]-3,7-dimethyl - nonatetraen - (2,4,6,8)-al-(1) and through the other of its reactive hydrogen atoms with 8-[2',6',6' - trimethyl-cyclohexen-(1')-yl]-6-methyl-octatrien-(3,5,7) - one-(2), thereby forming 1,18-di-[2',6',6'-trimethyl-cyclohexen-(1') - yl] - 3,7,12,16-tetramethyl-octadecaheptaen - (1,3,5,11,13,15,17) - yne - (8)-diol-(7,10); and treating said 1,18-di-[2',6',6'-trimethyl-cyclohexen-(1')-yl] - 3,7,12,16 - tetramethyl - octadecaheptaen - (1,3,5,11,13,15,17) - yne - (8) - diol-(7,10) with excess lithium aluminum hydride, thereby forming β-carotene.

5. A process which comprises condensing acetylene by means of metal-organic reactions through one of its reactive hydrogen atoms with 9-[2',6',6'-trimethyl-cyclohexen-(1')-yl] - 3,7 - dimethyl-nonatetraen-(2,4,6,8)-al-(1) and through the other of its reactive hydrogen atoms with 8-[2',6',6' - trimethyl-cyclohexadien-(1',3')-yl] - 6-methyl-octatrien-(3,5,7)-one-(2), thereby forming 1-[2',6',6'-trimethyl-cyclohexadien - (1',3')-yl]-18-[2',6',6'-trimethyl-cyclohexen - (1') - yl] - 3,7,12,16 - tetramethyl-octadecaheptaen - (1,3,5,11,13,15,17) - yne - (8) - diol-(7,10); and treating said 1-[2',6',6'-trimethyl-cyclohexadien-(1',3')-yl] - 18 - [2',6',6'-trimethyl - cyclohexen-(1') - yl] - 3,7,12,16 - tetramethyl - octadecaheptaen-(1,3,5,11,13,15,17)-yne-(8)-diol-(7,10) with excess lithium aluminum hydride, thereby forming 3,4-dehydro-β-carotene.

References Cited in the file of this patent

UNITED STATES PATENTS 2,369,162    Miles _____ Feb. 13, 1945
2,671,112    Inhoffen et al. _____ Mar. 2, 1954

OTHER REFERENCES

Inhoffen et al.: Annalen (Liebig's), vol. 588 (1954), pp. 117–119.